(12) United States Patent
Xie et al.

(10) Patent No.: US 11,385,926 B2
(45) Date of Patent: Jul. 12, 2022

(54) APPLICATION AND SYSTEM FAST LAUNCH BY VIRTUAL ADDRESS AREA CONTAINER

(71) Applicant: Intel Corporation, Santa Clara, CA (US)

(72) Inventors: Chao Xie, Shanghai (CN); Jia Bao, Shanghai (CN); Mingwei Shi, Shanghai (CN); Yifan Zhang, Shanghai (CN); Qiming Shi, Shanghai (CN); Beiyuan Hu, Shanghai (CN); Tianyou Li, Shanghai (CN); Xiaokang Qin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 16/478,791

(22) PCT Filed: Feb. 17, 2017

(86) PCT No.: PCT/CN2017/073870
§ 371 (c)(1),
(2) Date: Jul. 17, 2019

(87) PCT Pub. No.: WO2018/148923
PCT Pub. Date: Aug. 23, 2018

(65) Prior Publication Data
US 2019/0361730 A1    Nov. 28, 2019

(51) Int. Cl.
*G06F 9/46* (2006.01)
*G06F 9/48* (2006.01)
*G06F 12/0802* (2016.01)

(52) U.S. Cl.
CPC ............. *G06F 9/461* (2013.01); *G06F 9/485* (2013.01); *G06F 12/0802* (2013.01); *G06F 2212/152* (2013.01)

(58) Field of Classification Search
CPC ...... G06F 9/461; G06F 9/485; G06F 12/0802; G06F 2212/152; G06F 11/1441; G06F 11/1438
See application file for complete search history.

(56) References Cited

U.S. PATENT DOCUMENTS 5,247,673 A * 9/1993 Costa .................... G06F 15/161
                                            711/119
5,835,961 A * 11/1998 Harvey ............... G06F 12/1009
                                            711/206

(Continued)

OTHER PUBLICATIONS

International Search Report and Written Opinion for International Patent Application No. PCT/CN2017/073870, dated Nov. 15, 2017, 12 pages.

*Primary Examiner* — Adam Lee
(74) *Attorney, Agent, or Firm* — Jordan IP Law, LLC

(57) ABSTRACT

An application and system fast launch may provide a virtual memory address area (VMA) container to manage the restore of a context of a process, i.e., process context, saved in response to a checkpoint to enhance performance and to provide a resource efficient fast launch. More particularly, the fast launch may provide a way to manage, limit and/or delay the restore of a process context saved in response to a checkpoint, by generating a VMA container comprising VMA container pages, to restore physical memory pages following the checkpoint based on the most frequently used or predicted to be used. The application and system fast launch with the VMA container may avoid unnecessary input/output (I/O) bandwidth consumption, page faults and/or memory copy operations that may otherwise result from restoring the entire context of a VMA container without regard to frequency of use.

23 Claims, 9 Drawing Sheets

(56) References Cited

U.S. PATENT DOCUMENTS

| | | | |
|---|---|---|---|
| 6,292,820 B1* | 9/2001 | Korn | G06F 8/51 718/100 |
| 6,560,688 B1* | 5/2003 | Strongin | G06F 12/1027 345/568 |
| 6,795,873 B1* | 9/2004 | Barth | G06F 9/4881 710/10 |
| 7,073,173 B1 | 7/2006 | Willman | |
| 7,702,743 B1* | 4/2010 | Wong | G06F 12/1036 709/216 |
| 7,721,064 B1* | 5/2010 | Lam | G06F 12/1036 711/170 |
| 7,746,099 B1* | 6/2010 | Chan | H03K 19/17756 326/38 |
| 8,285,958 B1* | 10/2012 | Sallam | G06F 12/145 711/165 |
| 8,745,440 B1* | 6/2014 | Ceze | G06F 9/3842 714/11 |
| 9,645,628 B1* | 5/2017 | Loafman | G06F 9/5088 |
| 9,652,405 B1* | 5/2017 | Shain | G06F 11/1441 |
| 10,169,577 B1* | 1/2019 | Sobel | G06F 21/53 |
| 2002/0087816 A1* | 7/2002 | Atkinson | G06F 1/3203 711/156 |
| 2003/0101322 A1* | 5/2003 | Gardner | G06F 12/1491 711/163 |
| 2005/0235124 A1* | 10/2005 | Pomaranski | G06F 12/0223 711/170 |
| 2006/0026385 A1* | 2/2006 | Dinechin | G06F 9/45558 711/210 |
| 2006/0041739 A1* | 2/2006 | Iwakura | G06F 11/0778 713/2 |
| 2006/0117162 A1* | 6/2006 | Sauber | G06F 12/10 711/203 |
| 2007/0033344 A1* | 2/2007 | Tanaka | G06F 3/0632 711/115 |
| 2007/0294578 A1* | 12/2007 | Qiao | G06F 11/2046 714/17 |
| 2008/0104593 A1* | 5/2008 | Parekh | G06F 9/4881 718/100 |
| 2009/0019255 A1* | 1/2009 | Burns | G06F 12/126 711/208 |
| 2009/0024820 A1* | 1/2009 | Ponnuswamy | G06F 11/0778 711/170 |
| 2009/0049378 A1* | 2/2009 | Carmel | G06F 9/451 715/700 |
| 2010/0088572 A1* | 4/2010 | Ohnuki | G06F 9/30105 714/755 |
| 2011/0078404 A1* | 3/2011 | Knirsch | G06F 9/5016 711/170 |
| 2012/0054335 A1* | 3/2012 | Kieselbach | G06Q 10/06 709/224 |
| 2012/0117565 A1* | 5/2012 | Staelin | G06F 9/45558 718/1 |
| 2014/0237261 A1* | 8/2014 | Diep | G06F 12/1408 713/189 |
| 2014/0281364 A1 | 9/2014 | Buschardt et al. | |
| 2015/0081964 A1* | 3/2015 | Kihara | G06F 3/0649 711/114 |
| 2015/0106586 A1 | 4/2015 | Hallivuori et al. | |
| 2016/0110291 A1* | 4/2016 | Gordon | G06F 12/126 711/6 |
| 2016/0147670 A1 | 5/2016 | Li | |
| 2016/0350233 A1* | 12/2016 | Tsirkin | G06F 12/0223 |
| 2016/0378684 A1* | 12/2016 | Zmudzinski | G06F 12/1483 711/105 |
| 2016/0378688 A1* | 12/2016 | Rozas | G06F 12/1408 713/190 |
| 2017/0093669 A1* | 3/2017 | Nortman | H04L 43/14 |
| 2017/0212837 A1* | 7/2017 | Breternitz | G06F 3/0611 |
| 2018/0024938 A1* | 1/2018 | Paltashev | G06F 12/1027 711/133 |
| 2018/0032251 A1* | 2/2018 | Jung | G06F 13/1663 |
| 2018/0052614 A1* | 2/2018 | Sawa | G06F 3/0673 |
| 2021/0049070 A1* | 2/2021 | Gustafsson | G06F 12/08 |

* cited by examiner

APPLICATION AND SYSTEM FAST LAUNCH BY VIRTUAL ADDRESS AREA CONTAINER

CROSS REFERENCE TO RELATED APPLICATIONS

The present application is a U.S. National Phase patent application, which claims the benefit of priority to International Patent Application No. PCT/CN2017/073870 filed on Feb. 17, 2017.

TECHNICAL FIELD

Embodiments generally relate to a way to provide fast launch capabilities to an application and/or system. More particularly, embodiments relate to technology that manages, limits and/or delays the restore of a process context saved in response to a checkpoint.

BACKGROUND

Traditionally, a checkpoint thread may save the context of a process (e.g., environment data for an application) to a file in storage (e.g., disk storage). When the application or system is launched from a power cycle or restart, a checkpoint thread may be restored, including the process context (e.g., environment) from the file. The process context may include information saved to one or more virtual memory address areas (VMAs). VMAs may include at least two types, including anonymous VMAs and file mapped VMAs. Anonymous VMAs may include the heap and stack of a process. The checkpoint thread may save the anonymous VMAs, while file mapped VMAs may be restored from the files.

During the restore and/or the launch process of a traditional application or system (e.g., when a "start" action is triggered), when the launch process accesses the file mapped VMAs, the kernel and/or operating system (OS) may fetch the process context (e.g., information and/or data) from file storage, and load the process context into the VMAs pages. For anonymous VMAs, the checkpoint thread may read the context of each page of the saved anonymous VMA, and write the process context back to the process space for the process, causing many input/output (TO) operations to restore the physical memory pages, page faults, and memory copy operations when the process context is written back to the process space for the process.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
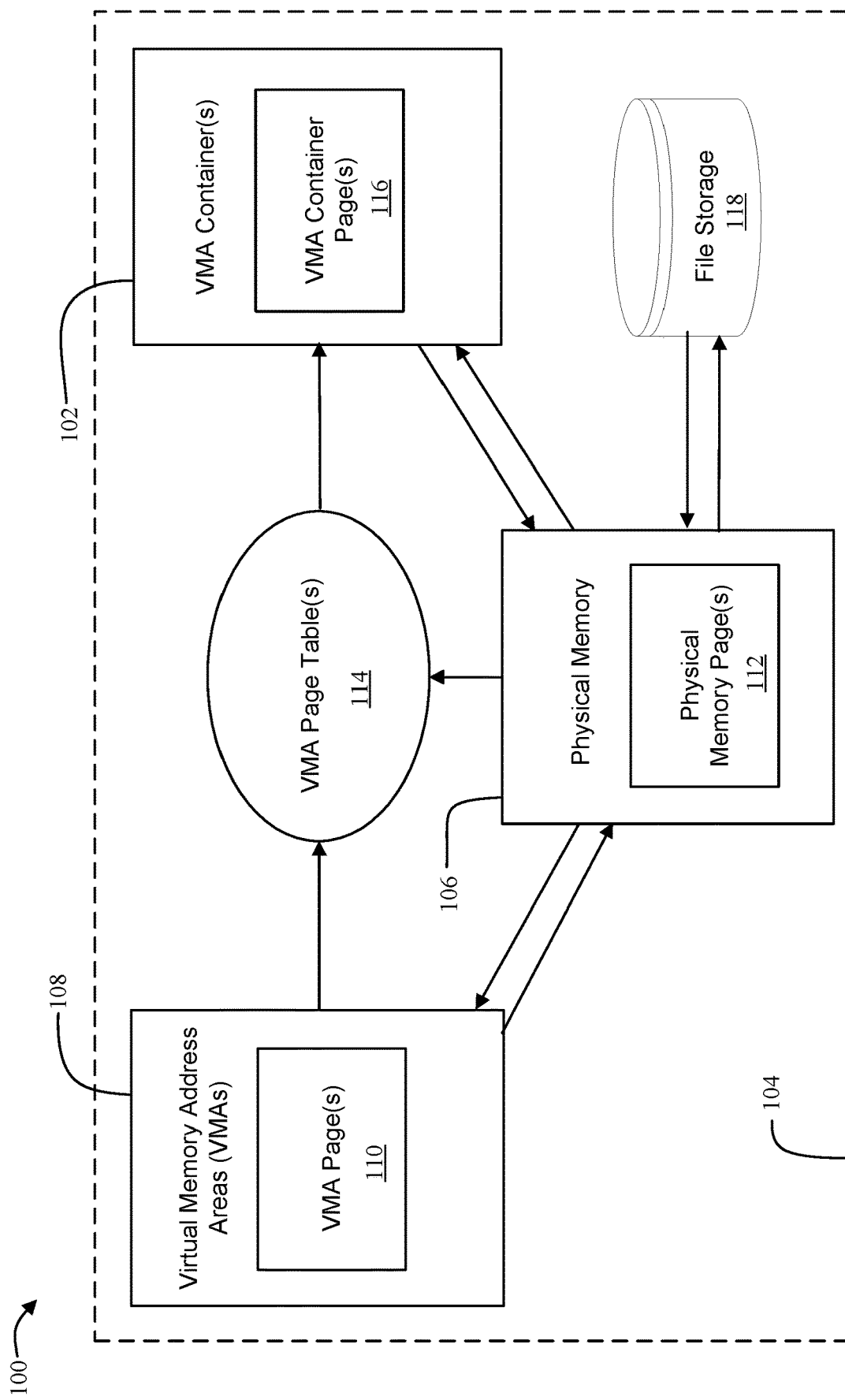
FIG. 1 is an illustration of an example of a fast launch system implemented with a virtual memory address area (VMA) container according to an embodiment.

FIG. 1 shows an illustration of an example of a fast launch system 100 implemented with one or more virtual memory address area (VMA) containers 102 according to an embodiment. The fast launch system 100 may comprise a memory 104 including one or more of physical memory 106 and a processor (not shown). The memory 104 may include one or more VMAs 108 comprising one or more VMA pages 110, physical memory pages 112 for a process executed by the processor, the one or more VMA containers 102, and one or more VMA page tables 114. The VMA container(s) 102 may comprise one or more VMA container pages 116, and the VMA page tables 114 may map the one or more physical memory pages 112 to the VMA container page(s) 116. The VMA container page(s) 116 may each be identified by a VMA container location (not shown).

The VMA pages 110, including one or more of the anonymous VMAs of one or more processes, may generally be saved to the VMA container 102 as the VMA container page(s) 116. As will be discussed in greater detail, the fast launch system 100 may use the VMA containers 102 to restore at least one of the VMA container page(s) 116 identified as "hot" (e.g., frequently used and/or predicted to be used). The VMA container 102 may avoid and/or delay restore of VMA container pages identified as "not hot" (e.g., not frequently used and/or not predicted to be used), which may in turn delay and/or avoid the input/output (IO) restore operations (e.g., I/O bandwidth consumption, page faults and/or memory copy operations) for the not hot VMA container pages. The fast launch system 100 process may access the VMA container pages 102 to determine which of the physical memory pages 112 to restore from the VMA container pages 102, in order to avoid copying VMAs pages 110 to restored physical memory pages without regard to whether the physical memory pages are hot (e.g., frequently used and/or predicted to be used) or not hot (e.g., not frequently used and/or not predicted to be used) in response to a restore/launch process.

For example, for an ANDROID fast boot up, the main launch process Zygote™ may spend many cycles (e.g., elapsed time) to initialize a JAVA runtime environment and load the java classes. In contrast to the fast launch system 100 implemented with the VMA container 102, a traditional checkpoint/restore procedure may load the physical file pages saved to file storage (e.g., disk storage) and restore the VMAs of Zygote™, even though not every JAVA class and JAVA heap may be hot (e.g., frequently accessed, or recently used by the process).

The fast launch system 100 may further comprise a memory management unit (MMU) (not shown). The MMU may copy a portion of a process context of the process from the one or more physical memory pages to at least one of the one or more VMA container pages. The process context may include one or more of a process state, a heap, a stack, or other process information. The VMA container location of each VMA container page 102 may include and/or identify one or more of a position in the VMA container or a VMA page index.

The VMA container 102 may store (e.g., save) anonymous VMAs and/or file-mapped VMAs in and/or as one or more VMA container pages 116. VMA page tables 114 may be configured to map one or more physical memory pages 112 to the position of one or more corresponding VMA container pages 116 and/or one or more VMA page indexes to the VMA container pages 116 (e.g., rather than mapping the physical memory addresses to virtual memory addresses).

In the event that execution of the process is stopped in response to the checkpoint, the MMU may save the portion of the process context to at least one of the one or more VMA container pages 116, and generate a mapping of the one or more VMA container pages 116 to the one or more physical memory pages 112 and the MMU may save a remaining portion of the process context (e.g., library files linked to one or more processes) to the file storage device 118.

When the process is restarted (e.g., checkpoint thread), a memory access request may be received to access at least one of the one or more physical memory pages saved that triggers a page fault, and the MMU may search the portion of the process context saved to the at least one of the one or more VMA container pages 116 based on the memory access request.

The memory 104 may allocate space in the memory 104 for one or more restored physical memory pages based on the search of the portion of the process context saved to the at least one of the one or more VMA container pages 116. The space allocated based on the search of the portion of the process context (e.g., identifying VMA container pages 116 corresponding to frequently used or predicted to be frequently used physical memory pages) avoids allocation of space unnecessarily to restore physical memory pages without regard to frequency of use or predicted frequency of use. The MMU may copy the portion of the process context in at least one of the one or more VMA container pages 116 that map to the one or more physical memory pages 112 to be restored as the one or more restored physical memory pages (e.g., restored to the physical memory 106) based on the memory access request, e.g., reading the VMA page content directly to the restored physical memory page.

The MMU may conduct a read from the one or more restored physical memory pages containing the portion of the process context based on the memory access request. The MMU may update the one or more VMA page tables 114 to map the one or more restored physical memory pages to the one or more VMA container pages 116. The one or more restored physical memory pages may be accessed based on the memory access request. The VMA page tables 114 mapping of the one or more restored physical memory pages to the one or more VMA container pages 116 eliminates system resource consumption (e.g., power and processing time) for restoration of one or more of the physical memory pages (e.g., including the input/output restoration operations) for which no after restart memory access requests are made (e.g., not hot pages).

Figure 2:
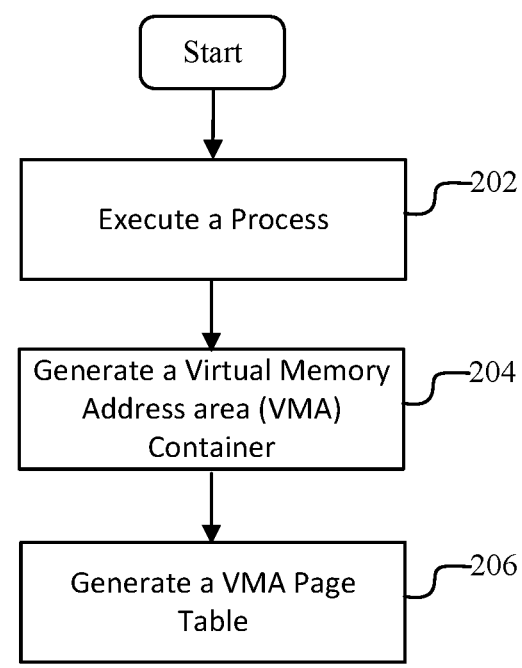
FIG. 2 is a flowchart of an example of a method of implementing a VMA container according to an embodiment.

FIG. 2 is a flowchart of an example of a method 200 of implementing the VMA container according to an embodiment. The VMA container may be as described above regarding VMA container 102, as shown in FIG. 1. The method 200 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 200 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 202 provides for executing, by a processor, a process, wherein the process is assigned one or more physical memory pages in a memory. Illustrated processing block 204 provides for generating, by a memory management unit (MMU), a virtual memory address area (VMA) container comprising one or more VMA container pages, wherein the VMA container pages are each identified by a VMA container location. The VMA container location may be identified by one or more of a position in the VMA container or a VMA page index. The MMU may copy the VMA pages from the VMAs to the VMA container pages. Illustrated processing block 206 provides for generating, by the MMU, a VMA page table to map the one or more physical memory pages to the one or more VMA container pages.

In one implementation, generating the VMA container comprises assessing, by the MMU, one or more performance factors of two or more memory devices that comprise the physical memory (e.g., system memory). The performance factors may include one or more of an access time, a retrieval time or storage capacity. The MMU may select at least one of the two or more memory devices to locate the VMA container. The two or more memory devices may include a swap space configured to operate in a swap-in mode. The MMU may save the VMA container to the swap space based on the one or more performance factors, when the checkpoint occurs.

Figure 3:
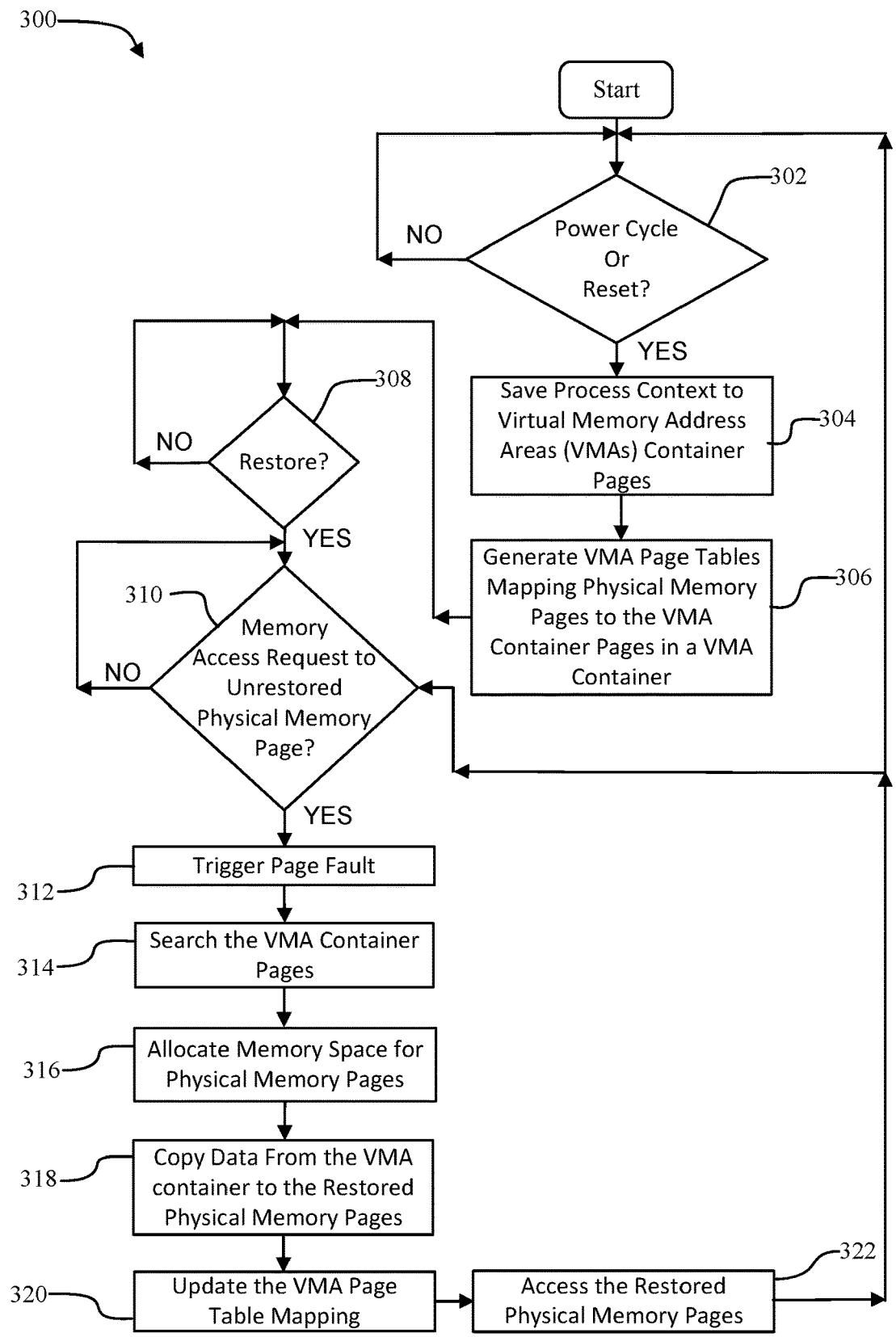
FIG. 3 is a flowchart of an example of a method of restoring one or more physical memory pages according to an embodiment.

Turning now to FIG. 3, a method 300 of restoring one or more physical memory pages is shown according to an embodiment. The VMA container may be as described above regarding the VMA container 102, as shown in FIG. 1. The method 300 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 302 provides for monitoring for a power cycle or reset, wherein execution of a process stops in response to a checkpoint. Illustrated processing block 304 provides for saving, by a memory management unit (MMU), a portion of a process context of the process from the one or more physical memory pages to at least one of the one or more VMA container pages, and saving a remaining portion of the process context to a file storage device. The process context may include one or more of a process state, a heap, a stack, or other process information. The VMA container location may be identified by one or more of a position in the VMA container or a VMA page index. Illustrated processing block 306 provides for generating a mapping of the one or more VMA container pages to the one or more physical memory pages.

Block 308 may provide for monitoring for a restore of the system and/or process, and restarting the process in response to the restore. Illustrated processing block 310 provides for receiving a memory access request to access at least one of the one or more physical memory pages saved to the at least one of the one or more VMA container pages. Illustrated processing block 312 provides for triggering a page fault based on the memory access request, e.g., read by the MMU of the one or more physical memory pages (e.g., unrestored), when the memory access request is to access at least one of the one or more physical memory pages saved to the at least one of the one or more VMA container pages. Illustrated processing block 314 provides for searching, by the MMU, the portion of the process context saved to the at least one of the one or more VMA container pages based on the memory access request. Illustrated processing block 316 provides for allocating space in the memory for one or more restored physical memory pages based on the search of the portion of the process context saved to the at least one of the one or more VMA container pages (e.g., identifying the portion of the process context for the memory access request). Illustrated processing block 318 provides for copying, by the MMU, the portion of the process context in at least one of the one or more VMA container pages that map to the one or more physical memory pages to the one or more restored physical memory pages based on the memory access request.

Illustrated processing block 320 provides for updating, by the MMU, the VMA page table to map the one or more restored physical memory pages to the one or more VMA container pages, and maintaining (e.g., updating) the mapping during system operations. Illustrated processing block 322 provides for accessing the one or more restored physical memory pages based on the memory access request. The VMA container and mapping the VMA container pages to the physical memory pages may eliminate system resource consumption (e.g., power and processing time) for restoration of one or more of the physical memory pages for which no after restart memory access requests are made (e.g., not hot pages).

Figure 4:
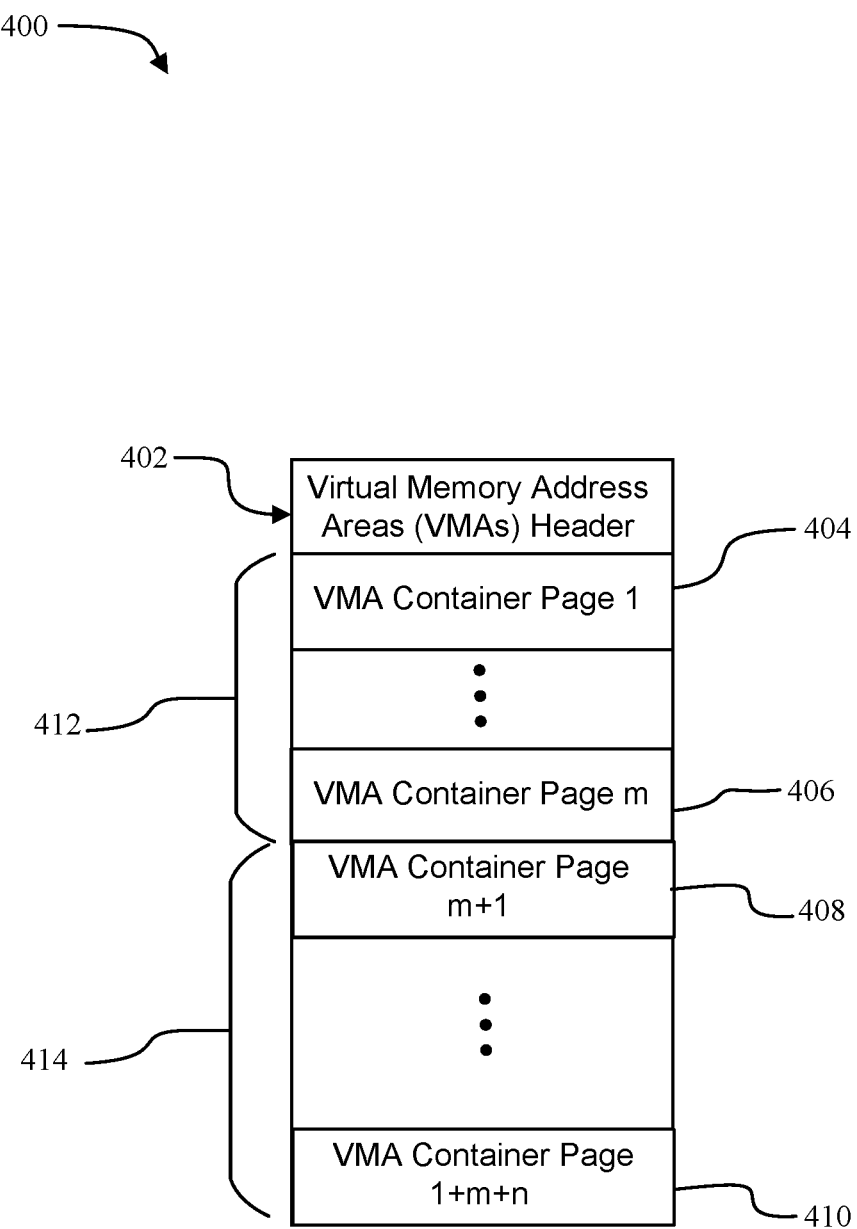
FIG. 4 is a block diagram of example of a VMA container according to an embodiment.

FIG. 4 is a block diagram of an example of the VMA container 400 according to an embodiment. The VMA container 400 may include a VMA header 402 that includes VMA container location information. The VMA container 400 may be as described above regarding the VMA container 102, as shown in FIG. 1. The VMA container location of the VMA container pages 404, 406, 408, 410 may be identified by one or more of a position in the VMA container 400 or a VMA page index. The VMA header 402 and the content of the VMA container pages may be stored in the VMA container 400, in some arrangement such as by process identifiers 412, 414. The VMA container 400 may be one or more partitions of a disk storage device, or some other memory storage, and the VMA container 400 may be compressed in order to save input/output (IO) bandwidth.

The VMA page tables may map the physical memory pages to one or more positions (e.g., locations) within one or more VMA containers 400 and/or one or more VMA page indexes to the VMA container pages corresponding to the physical memory pages.

The VMA container 400 and/or VMA container pages may store the content of the physical memory pages (e.g., process context, data, environment) stored in the physical memory prior to a power cycle or reset. The VMA container 400 may be located in a special structure (e.g., container) arranged in pages, containing content of the physical memory pages (e.g., anonymous pages, heap, stack of a process) saved as a result of a power cycle or reset. A memory access request to read a physical memory page saved to the VMA page (e.g., and/or VMA container page) may cause a page fault that restores the content (e.g., process context, data, environment) from the VMA container pages. Upon restore, the memory management unit (MMU) may map the VMA container pages to the restored physical memory pages. When the MMU receives a memory access request to an unrestored physical memory page saved to a VMA container page, a page fault may occur causing the kernel or operating system to load the VMA container page content to the physical memory to restore the physical memory page. Accordingly, the physical memory pages restored to memory following a power cycle or reset may be delayed and/or limited based on whether the physical memory pages are considered hot pages (e.g., frequently and/or predicted to be frequently used) to be accessed after a power cycle or reset.

Traditionally, a kernel (e.g., operating system) may load physical memory pages (e.g., a first copy) to file cache pages, and load to the memory a second copy of the physical memory pages to be used by a user's process (e.g., process thread), thus a second copy of the memory content may be created and maintained. In contrast, the VMA container 400 may be used to avoid allocating large amounts of memory upon a restore, by reloading memory content (e.g., some portion of a process context) following a power cycle or reset when needed, and avoiding the resource overhead of the kernel maintaining multiple copies of physical memory pages to track the physical memory pages in memory in the event of a power cycle or reset.

The VMA container may be implement in one or more kernel application interfaces (APIs), which a developer may use to configure one or more applications to use the VMA container 400. The VMA container 400, MMU, kernel and/or operating system, may be configured to assess performance factors of the memory devices available. The performance factors may include one or more of an access time, retrieval time, or storage capacity. The VMA container 400 may be located at one or more of the memory devices based on one or more of the performance factors of the memory devices.

Figure 5:
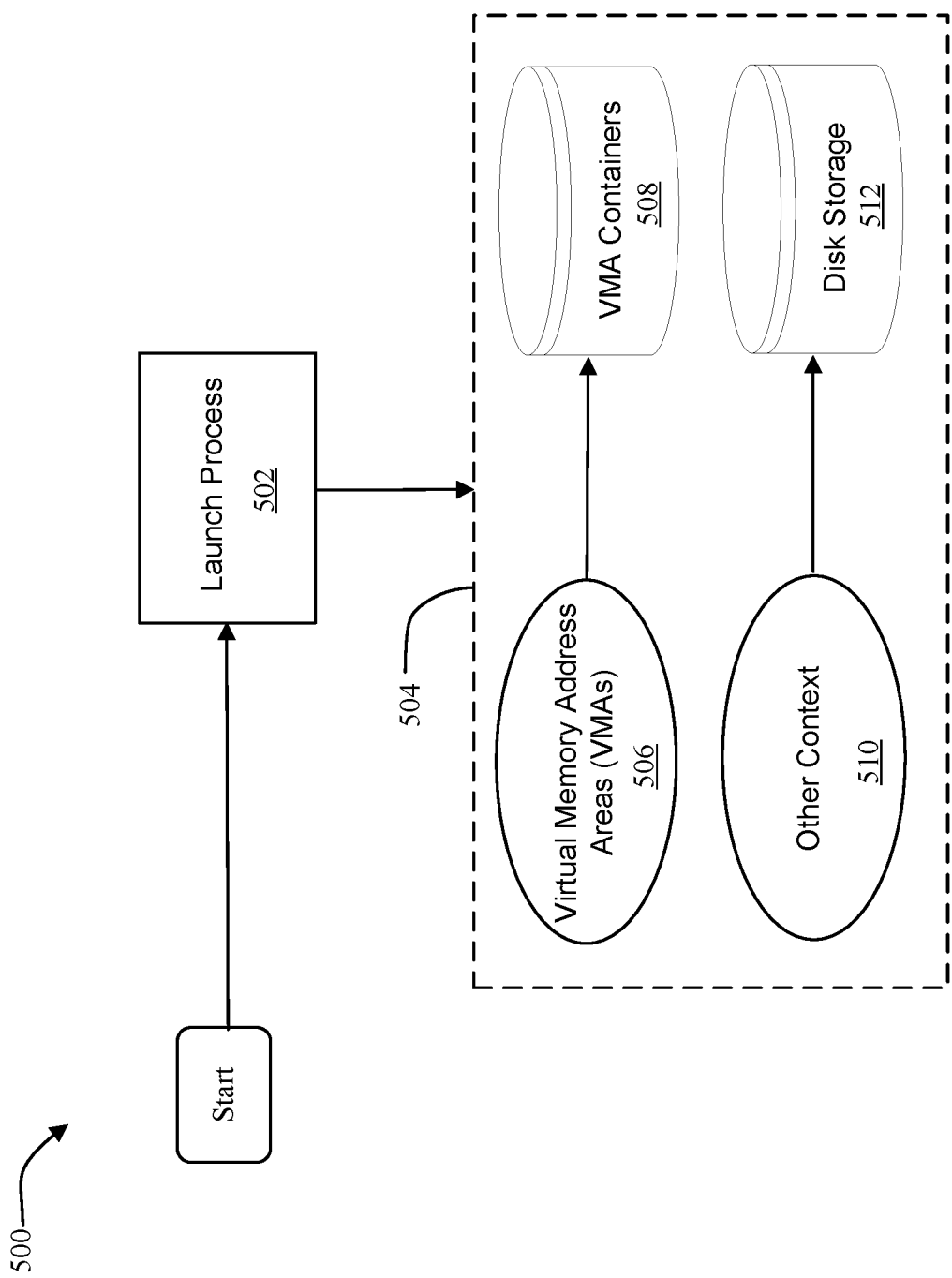
FIG. 5 is a block diagram of example of a checkpoint procedure according to an embodiment.

FIG. 5 is a block diagram of an example of a checkpoint procedure 500 according to an embodiment. The launch process 502 may stop execution of a process in a memory 504 in response to a checkpoint. The MMU may save the portion of the process context from the VMAs 506 to at least one of the one or more VMA container pages in one or more VMA containers 508, and generate a mapping of the at least one of the one or more VMA container pages to one or more physical memory pages. The fast launch system may save a remaining portion of the process context, e.g., other context 510, to a file storage device 512.

Figure 6:
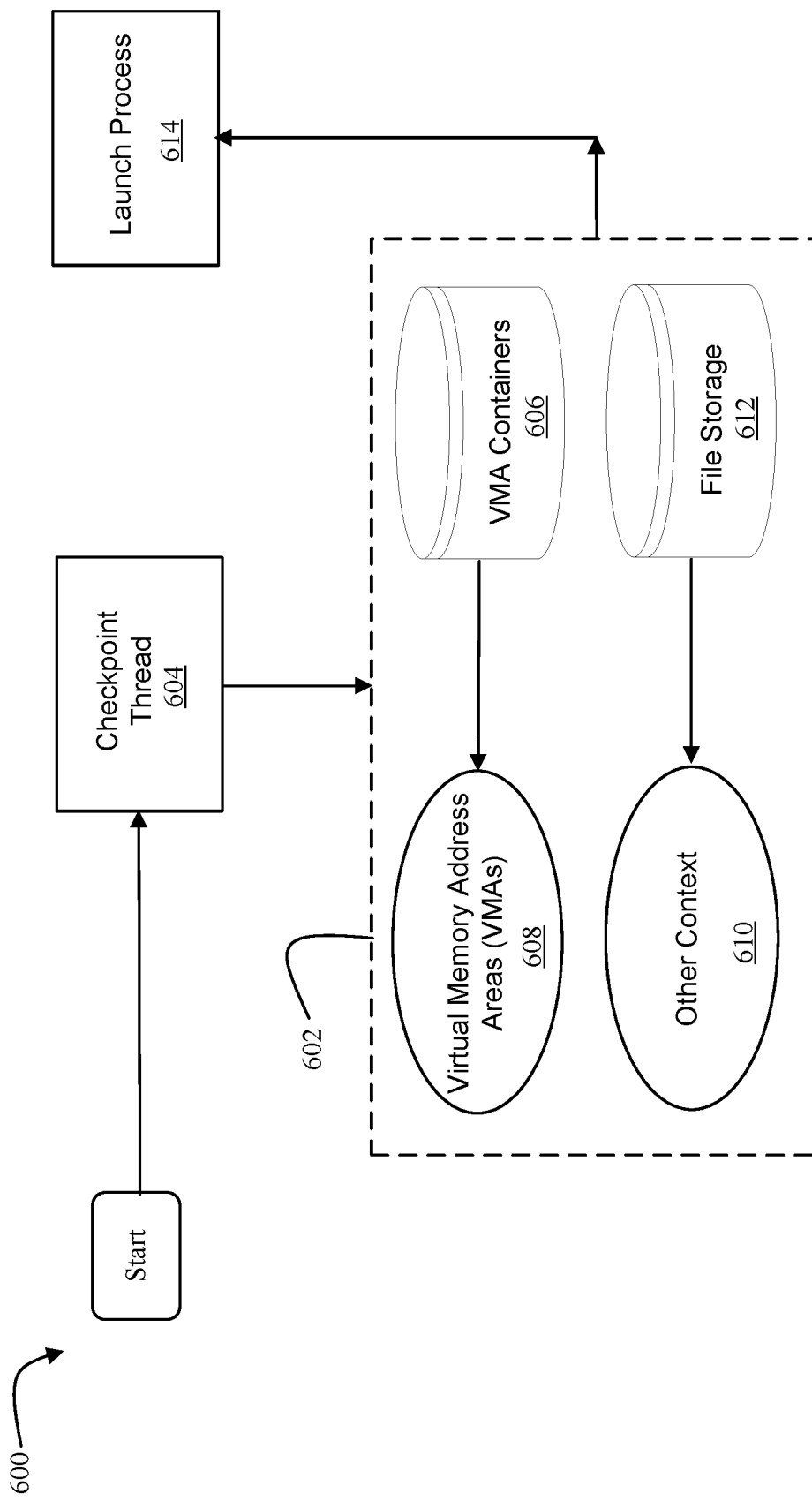
FIG. 6 is a block diagram of example of a restore procedure according to an embodiment.

FIG. 6 is a block diagram of an example of a restore procedure 600 according to an embodiment. The restore procedure 600 may restart a process in memory 602 following a checkpoint. The fast launch system may receive a memory access request, following a checkpoint thread 604. Receipt of a memory access request to access at least one of the one or more physical memory pages saved to the at least one of the one or more VMA container pages may trigger a page fault. The MMU may search the portion of the process context saved to the at least one of the one or more VMA container pages in at least one of the one or more VMA containers 606 based on the memory access request. The memory 602 may allocate space in the memory 602 for one or more restored physical memory pages based on a search of the portion of the process context saved to the at least one of the one or more VMA container pages in the one or more VMA containers 606. The MMU may copy the portion of the process context in at least one of the one or more VMA container pages to the VMAs 608 that map to the one or more physical memory pages (e.g., one or more restored physical memory pages) based on the memory access request. The MMU may restore the other context 610 with the remaining portion of the process context saved in the file storage 612 based on the memory access request and/or the checkpoint thread 604. The MMU may conduct a read from the one or more restored physical memory pages containing the portion of the process context based on the memory access request. The MMU may update the VMA page table to map the one or more restored physical memory pages to the one or more VMA container pages. The process launch 614 may return the restarted/restored process to the context prior to the checkpoint previously stopping execution of the process. The fast launch system implemented with the VMA container 606 including mapping the VMA container pages to the physical memory pages provide for eliminating restoration of the physical memory pages for which no after restart memory access requests are made.

Figure 7:
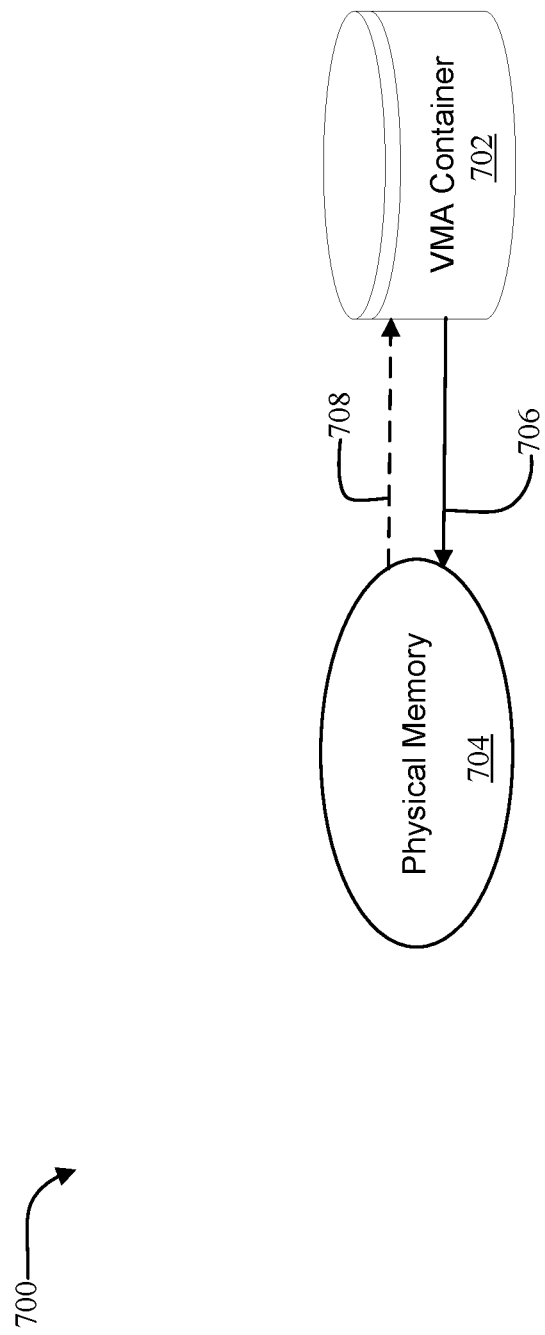
FIG. 7 is a block diagram of example of a swap disk implemented as a VMA container according to an embodiment.

FIG. 7 is a block diagram 700 of an example of a swap disk implemented as a VMA container 702 according to one embodiment. In one embodiment, the memory 104 of FIG. 1 may include two or more memory devices, including a swap disk implemented as a VMA container 702 and physical memory 704.

The swap disk implemented as a VMA container 702 may be configured so that the MMU may save 708 the VMA container 702 to the swap space when a checkpoint occurs. When a checkpoint thread and/or process restart occur, the VMA container 702 may operate in a swap-in mode 706 to copy VMA container pages from the VMA container 702 to the physical memory 704.

For example, the Linux operating system may be implemented with swap functionality to use a swap space (e.g., disk or some other memory storage technology) as a VMA container that allows swap in operations while restricting or limiting swap out operations. When a check point occurs the launch process may write VMA container pages to the swap space, and the VMA page table entries follow a swap entry format. Following a restore event, when a memory access request is received to access at least one of the one or more physical memory pages (e.g., unrestored) saved to the at least one of the one or more VMA container pages, a page fault may occur. Linux manages page faults such that when the page table entry is a swap entry, then Linux may execute a swap in procedure that causes the restore of physical memory pages from the VMA pages.

The MMU may also assess one or more performance factors of available memory devices. The performance factors may include one or more of an access time, retrieval time or capacity. The MMU may select one or more of the memory devices to locate the VMA container based on one or more of the performance factors.

Figure 8:
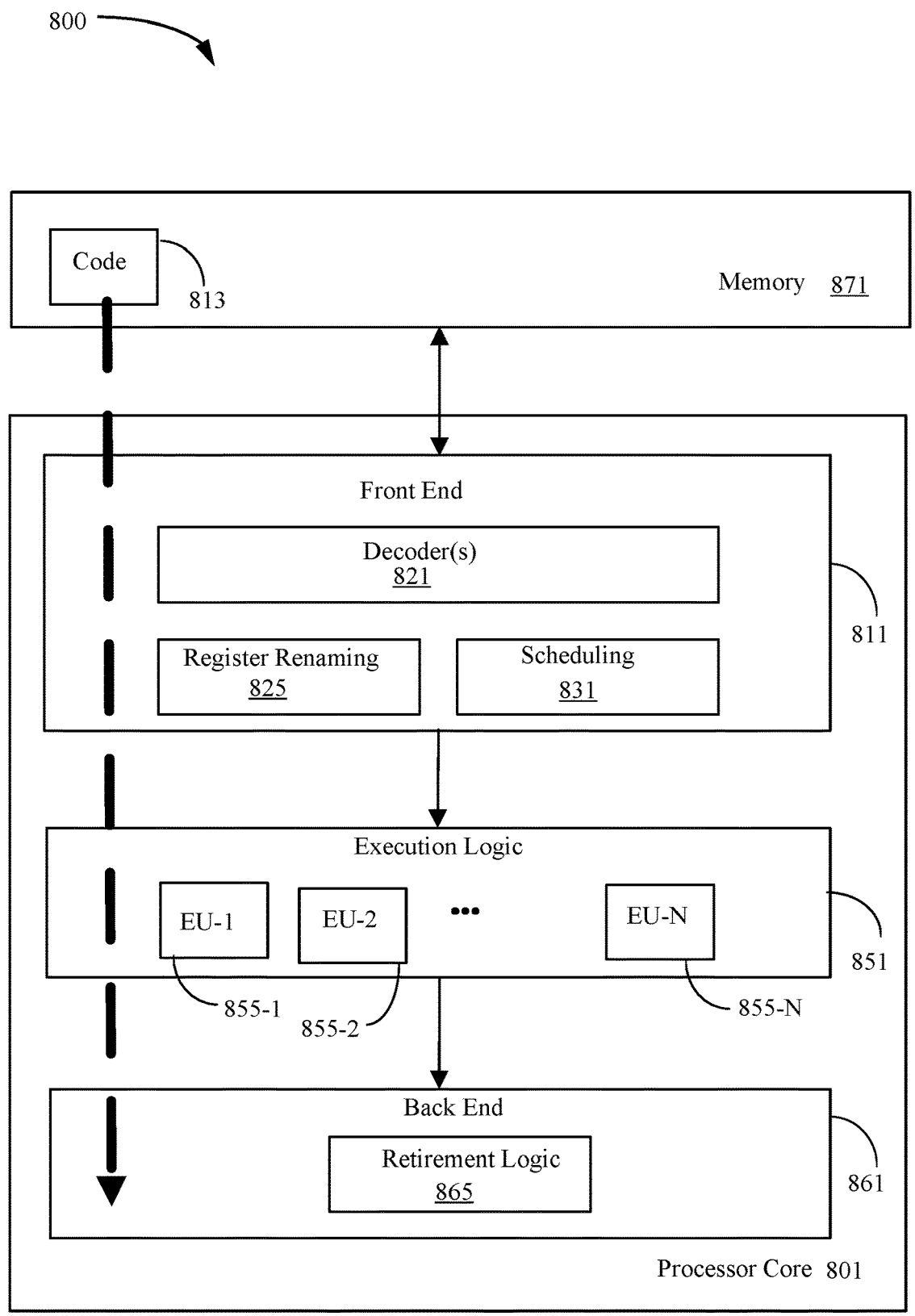
FIG. 8 is a block diagram of an example of a processor according to an embodiment.

FIG. 8 is a block diagram 800 of an example of a processor core 801 according to one embodiment. The processor core 801 may be the core for any type of processor, such as a micro-processor, an embedded processor, a digital signal processor (DSP), a network processor, or other device to execute code. Although only one processor core 801 is illustrated in FIG. 8, a processing element may alternatively include more than one of the processor core 801 illustrated in FIG. 8. The processor core 801 may be a single-threaded core or, for at least one embodiment, the processor core 801 may be multithreaded in that it may include more than one hardware thread context (or "logical processor") per core.

FIG. 8 also illustrates a memory 807 coupled to the processor core 801. The memory 807 may be any of a wide variety of memories (including various layers of memory hierarchy) as are known or otherwise available to those of skill in the art. The memory 871 may include one or more code 813 instruction(s) to be executed by the processor core 801, wherein the code 813 may implement the method 200 (FIG. 2) and/or method 300 (FIG. 3), already discussed. The processor core 801 follows a program sequence of instructions indicated by the code 813. Each instruction may enter a front end portion 811 and be processed by one or more decoders 821. The decoder 821 may generate as its output a micro operation such as a fixed width micro operation in a predefined format, or may generate other instructions, microinstructions, or control signals which reflect the original code instruction. The illustrated front end portion 811 also includes register renaming logic 825 and scheduling logic 831, which generally allocate resources and queue the operation corresponding to the convert instruction for execution.

The processor core 801 is shown including execution logic 851 having a set of execution units 855-1 through 855-N. Some embodiments may include a number of execution units dedicated to specific functions or sets of functions. Other embodiments may include only one execution unit or one execution unit that may perform a particular function. The illustrated execution logic 851 performs the operations specified by code instructions.

After completion of execution of the operations specified by the code instructions, back end logic 861 retires the instructions of the code 813. In one embodiment, the processor core 801 allows out of order execution but requires in order retirement of instructions. Retirement logic 865 may take a variety of forms as known to those of skill in the art (e.g., re-order buffers or the like). In this manner, the processor core 801 may be transformed during execution of the code 813, at least in terms of the output generated by the decoder, the hardware registers and tables utilized by the register renaming logic 825, and any registers (not shown) modified by the execution logic 851.

Although not illustrated in FIG. 8, a processing element may include other elements on chip with the processor core 801. For example, a processing element may include memory control logic along with the processor core 801. The processing element may include I/O control logic and/or may include I/O control logic integrated with memory control logic. The processing element may also include one or more caches.

The memory may be external to the processor (e.g., external memory), and/or may be coupled to the processor by, for example, a memory bus. In addition, the memory may be implemented as main memory. The memory may include, for example, volatile memory, non-volatile memory, and so on, or combinations thereof. For example, the memory may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EE-PROM), etc.), phase change memory (PCM), and so on, or combinations thereof. The memory may include an array of memory cells arranged in rows and columns, partitioned into independently addressable storage locations. The processor and/or operating system may use a secondary memory storage with the memory to improve performance, capacity and flexibility.

Non-limiting examples of non-volatile memory may include any or a combination of: solid state memory (such as planar or 3-dimensional (3D) NAND flash memory or NOR flash memory), 3D cross point memory, storage devices that use chalcogenide phase change material (e.g., chalcogenide glass), byte addressable non-volatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EE-PROM), other various types of non-volatile random access memories (RAMs), and magnetic storage memory. In some embodiments, 3D cross point memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices that implement such standards may be referred to as DDR-based interfaces.

Figure 9:
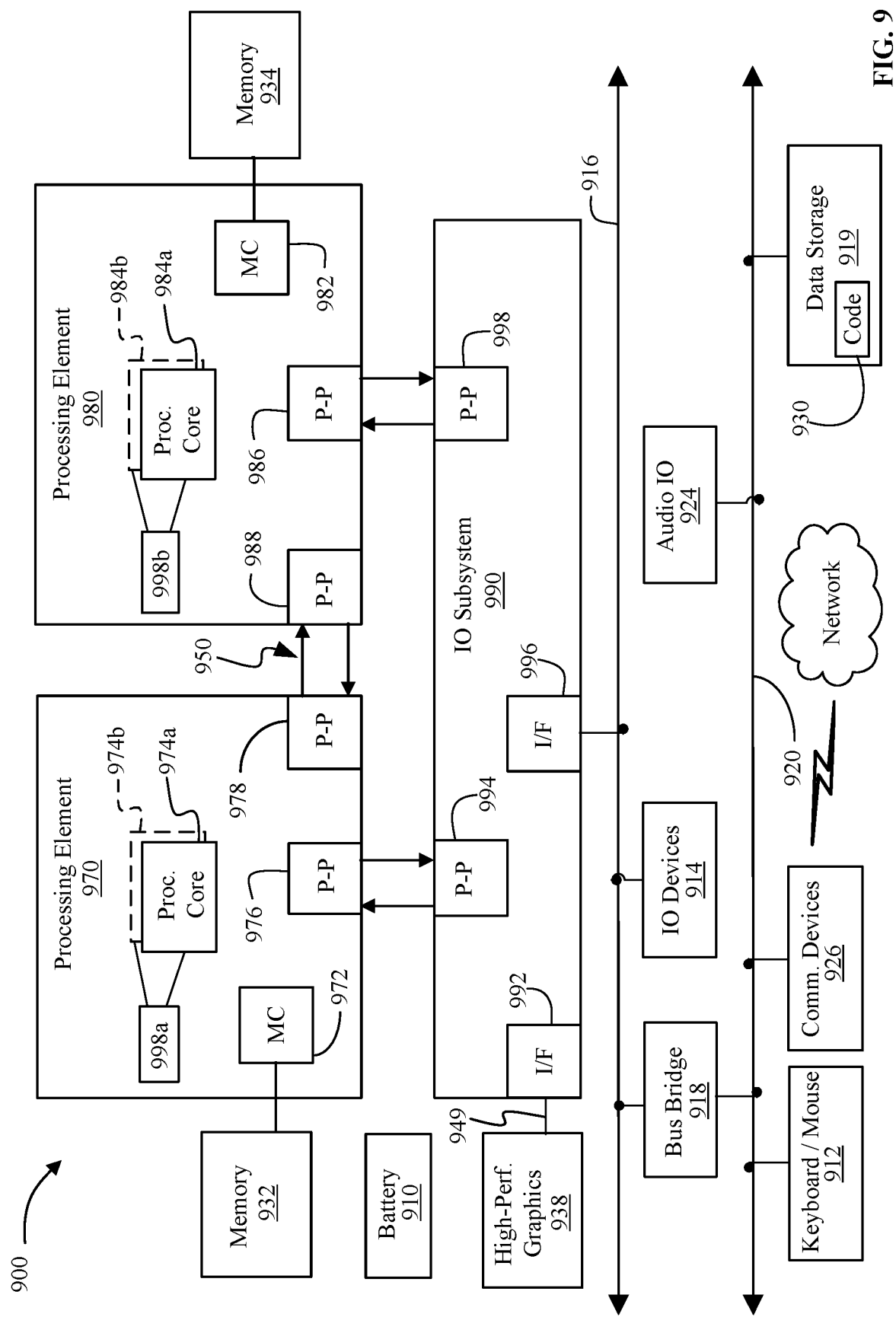
FIG. 9 is a block diagram of an example of a computing system according to an embodiment.

Referring now to FIG. 9, shown is a block diagram of a computing system 900 embodiment in accordance with an embodiment. Shown in FIG. 9 is a multiprocessor system 900 that includes a first processing element 970 and a second processing element 980. While two processing elements 970 and 980 are shown, it is to be understood that an embodiment of the system 900 may also include only one such processing element.

The system 900 is illustrated as a point-to-point interconnect system, wherein the first processing element 970 and the second processing element 980 are coupled via a point-to-point interconnect 950. It should be understood that any or all of the interconnects illustrated in FIG. 9 may be implemented as a multi-drop bus rather than point-to-point interconnect.

As shown in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code in a manner similar to that discussed above in connection with FIG. 7. The cores that may execute one or more instructions such as a read instruction, a write instruction, an erase instruction, a move instruction, an arithmetic instruction, a control instruction, and so on, or combinations thereof. The cores may, for example, execute one or more instructions to move data (e.g., program data, operation code, operand, etc.) between a cache or a register (not shown) and the memory and/or the secondary memory storage, to read the data from the memory, to write the data to the memory, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

Each processing element 970, 980 may include at least one shared cache 999a, 999b. The shared cache 999a, 999b may store data (e.g., instructions) that are utilized by one or more components of the processor, such as the cores 974a, 974b and 984a, 984b, respectively. For example, the shared cache 999a, 999b may locally cache data stored in a memory 932, 934 for faster access by components of the processor. In one or more embodiments, the shared cache 999a, 999b may include one or more mid-level caches, such as level 2 (L2), level 3 (L3), level 4 (L4), or other levels of cache, a last level cache (LLC), and/or combinations thereof.

While shown with only two processing elements 970, 980, it is to be understood that the scope of the embodiments are not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There may be a variety of differences between the processing elements 970, 980 in terms of a spectrum of metrics of merit including architectural, micro architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

The first processing element 970 may further include memory controller logic (MC) 972 and point-to-point (P-P) interfaces 976 and 978. Similarly, the second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976 986, respectively. As shown in FIG. 9, the I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple the graphics engine 938 to the I/O subsystem 990. Alternately, a point-to-point interconnect may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the embodiments are not so limited.

As shown in FIG. 9, various I/O devices 914 (e.g., speakers, cameras, sensors) may be coupled to the first bus 916, along with a bus bridge 918 which may couple the first bus 916 to a second bus 920. In one embodiment, the second bus 920 may be a low pin count (LPC) bus. Various devices may be coupled to the second bus 920 including, for example, a keyboard/mouse 912, communication device(s) 926, and a data storage unit 919 such as a disk drive or other mass storage device which may include code 930, in one embodiment. The illustrated code 930 may implement the method 200 (FIG. 2) and/or method 300 (FIG. 3), already discussed, and may be similar to the code 813 (FIG. 8), already discussed. Further, an audio I/O 924 may be coupled to second bus 920 and a battery 910 may supply power to the computing system 900.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a fast launch system comprising a processor, a memory including one or more physical memory pages for a process executed by the processor, a virtual memory address area (VMA) container comprising one or more VMA container pages, wherein the VMA container pages are each identified by a VMA container location, and a VMA page table to map the one or more physical memory pages to the one or more VMA container pages.

Example 2 may include the system of Example 1, further comprising a memory management unit (MMU), wherein the MMU copies a portion of a process context of the process from the one or more physical memory pages to at least one of the one or more VMA container pages, wherein the process context includes one or more of a process state, a heap, a stack, or other process information, wherein the VMA container location is identified by one or more of a position in the VMA container or a VMA page index.

Example 3 may include the system of Example 2, wherein execution of the process stops in response to the checkpoint, wherein the MMU saves the portion of the process context to at least one of the one or more VMA container pages, and generates a mapping of the one or more VMA container pages to the one or more physical memory pages and saves a remaining portion of the process context to a file storage device.

Example 4 may include the system of Example 3, wherein, when the process is restarted, receipt of a memory access request to access at least one of the one or more physical memory pages saved to the at least one of the one or more VMA container pages, triggers a page fault, and the MMU searches the portion of the process context saved to the at least one of the one or more VMA container pages based on the memory access request.

Example 5 may include the system of Example 4, wherein the memory allocates memory space for one or more restored physical memory pages based on the search of the portion of the process context saved to the at least one of the one or more VMA container pages, and the MMU copies the portion of the process context in at least one of the one or more VMA container pages that map to the one or more physical memory pages to the one or more restored physical memory pages based on the memory access request.

Example 6 may include the system of Example 5, wherein the MMU conducts a read from the one or more restored physical memory pages containing the portion of the process context based on the memory access request.

Example 7 may include the system of Example 6, wherein the MMU updates the VMA page table to map the one or more restored physical memory pages to the one or more VMA container pages.

Example 8 may include the system of Example 6, wherein the one or more restored physical memory pages are accessed based on the memory access request, and wherein the VMA page table to map of the one or more physical memory pages to the one or more VMA container pages in the VMA container eliminates restoration of one or more of the physical memory pages for which no after restart memory access requests are made.

Example 9 may include the system of any one of Examples 2 to 8, wherein the memory includes two or more memory devices, wherein the MMU assesses one or more performance factors of the two or more memory devices, wherein the performance factors include one or more of an access time or retrieval time, wherein the MMU selects one or more of the two or more memory devices to locate the VMA container, wherein the two or more memory devices include a swap space configured to operate in a swap-in mode, and wherein, when the checkpoint occurs, the MMU saves the VMA container to the swap space based on the one or more performance factors.

Example 10 may include a method of managing a fast launch, comprising: executing, by a processor, a process, wherein the process is assigned one or more physical memory pages in a memory; generating, by a memory management unit (MMU), a virtual memory address area (VMA) container comprising one or more VMA container pages, wherein the VMA container pages are each identified by a VMA container location; and generating, by the MMU, a VMA page table to map the one or more physical memory pages to the one or more VMA container pages.

Example 11 may include the method of Example 10, further comprising copying, by the MMU, a portion of a process context of the process from the one or more physical memory pages to at least one of the one or more VMA container pages, wherein the process context includes one or more of a process state, a heap, a stack, or other process information, wherein the VMA container location is identified by one or more of a position in the VMA container or a VMA page index.

Example 12 may include the method of Example 11, further comprising: stopping execution of the process in response to a checkpoint; saving, by the MMU, the portion of the process context to at least one of the one or more VMA container pages, and generating a mapping the at least one of the one or more VMA container pages to the one or more physical memory pages; and saving a remaining portion of the process context to a file storage device.

Example 13 may include the method of Example 12, further comprising: restarting the process following the checkpoint; receiving a memory access request to access at least one of the one or more physical memory pages saved to the at least one of the one or more VMA container pages triggering a page fault; and searching, by the MMU, the portion of the process context saved to the at least one of the one or more VMA container pages based on the memory access request.

Example 14 may include the method of Example 13, further comprising: allocating space in the memory for one or more restored physical memory pages based on the search of the portion of the process context saved to the at least one of the one or more VMA container pages; and copying, by the MMU, the portion of the process context in at least one of the one or more VMA container pages that map to the one or more physical memory pages to the one or more restored physical memory pages based on the memory access request.

Example 15 may include the method of Example 14, further comprising: conducting, by the MMU, a read from the one or more restored physical memory pages containing the portion of the process context based on the memory access request.

Example 16 may include the method of Example 14, further comprising: updating, by the MMU, the VMA page table to map the one or more restored physical memory pages to the one or more VMA container pages; accessing the one or more restored physical memory pages based on the memory access request; and eliminating restoration of one or more of the physical memory pages for which no after restart memory access requests are made.

Example 17 may include the method of any one of Examples 11 to 16, wherein the memory includes two or more memory devices, the method further comprising: assessing, by the MMU, one or more performance factors of the two or more memory devices, wherein the performance factors include one or more of an access time or a retrieval time; selecting, by the MMU, at least one of the two or more memory devices to locate the VMA container, wherein the two or more memory devices include a swap space configured to operate in a swap-in mode; and saving, by the MMU, the VMA container to the swap space based on the one or more performance factors, when the checkpoint occurs.

Example 18 may include at least one computer readable storage medium comprising a set of instructions, which when executed by a computing device, cause the computing device to execute, by a processor, a process, wherein the process is assigned one or more physical memory pages in a memory; generate, by a memory management unit (MMU), a virtual memory address area (VMA) container comprising one or more VMA container pages, wherein the VMA container pages are each identified by a VMA container location; and generate, by the MMU, a VMA page table to map the one or more physical memory pages to the one or more VMA container pages.

Example 19 may include the at least one computer readable storage medium of Example 18, wherein the instructions, when executed, cause a computing device to copy, by the MMU, a portion of a process context of the process from the one or more physical memory pages to at least one of the one or more VMA container pages, wherein the process context is to include one or more of a process state, a heap, a stack, or other process information, wherein the VMA container location is to be identified by one or more of a position in the VMA container or a VMA page index.

Example 20 may include the at least one computer readable storage medium of Example 19, wherein the instructions, when executed, further cause the computing device to stop execution of the process in response to a checkpoint, and save, by the MMU, the portion of the process context to at least one of the one or more VMA container pages, and map the one or more VMA container pages to the one or more physical memory pages and save a remaining portion of the process context to a file storage device.

Example 21 may include the at least one computer readable storage medium of Example 20, wherein the instructions, when executed, further cause the computing device to: restart the process following the checkpoint; receive a memory access request to access at least one of the one or more physical memory pages saved to the at least one of the one or more VMA container pages, the instructions further cause the computing device to trigger a page fault; and search, by the MMU, the portion of the process context saved to the at least one of the one or more VMA container pages based on the memory access request.

Example 22 may include the at least one computer readable storage medium of Example 21, wherein the instructions, when executed, further cause the computing device to: allocate, by the memory, space in the memory for one or more restored physical memory pages based on the search of the portion of the process context saved to the at least one of the one or more VMA container pages; and copy, by the MMU, the portion of the process context in at least one of the one or more VMA container pages that map to the one or more physical memory pages to the one or more restored physical memory pages based on the memory access request.

Example 23 may include the at least one computer readable storage medium of Example 22, wherein the instructions, when executed, further cause the computing device to: conduct, by the MMU, a read from the one or more restored physical memory pages containing the portion of the process context based on the memory access request; update, by the MMU, the VMA page table to map the one or more restored physical memory pages to the one or more VMA container pages; access the one or more restored physical memory pages based on the memory access request; and eliminate restoration of one or more of the physical memory pages for which no after restart memory access requests are made.

Example 24 may include the at least one computer readable storage medium of any one of claims 19 to 23, wherein the memory includes two or more memory devices, wherein the instructions, when executed, further cause the computing device to: assess, by the MMU, one or more performance factors of the two or more memory devices, wherein the performance factors are to include one or more of an access time or a retrieval time; select, by the MMU, at least one of the two or more memory devices to locate the VMA container, wherein the two or more memory devices include a swap space configured to operate in a swap-in mode; and save, by the MMU, the VMA container to the swap space based on the one or more performance factors, when the checkpoint occurs.

Example 25 may include a fast launch system comprising means for performing the method of any one of Examples 10 to 17.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a processor;
a memory including:
one or more physical memory pages associated with a process executed by the processor, wherein a process context associated with the process includes a first portion and a second portion, wherein the first portion is different from the second portion,
a virtual memory address area (VMA) container comprising one or more VMA container pages, wherein the one or more VMA container pages are each identified by a location within the VMA container, and
a VMA page table to map the one or more physical memory pages to the one or more VMA container pages; and
a memory management unit (MMU) that is to:
save the first portion of the process context to the at least one of the one or more VMA container pages,
allocate space in the memory for one or more restored physical memory pages based on a search of the first portion of the process context saved to the at least one of the one or more VMA container pages,
copy the first portion of the process context in the at least one of the one or more VMA container pages to the one or more restored physical memory pages based on a memory access request, and
update the VMA page table to map the one or more restored physical memory pages to the at least one of the one or more VMA container pages.

2. The system of claim 1, wherein the process context includes one or more of a process state, a heap, a stack, or other process information, and wherein the one or more VMA container pages are each identified by a VMA page index.

3. The system of claim 2, wherein execution of the process stops in response to a checkpoint associated with a checkpoint thread occurring, and wherein the MMU generates a mapping of the one or more VMA container pages to the one or more physical memory pages and saves the second portion of the process context to a file storage device.

4. The system of claim 3, wherein, when the process is restarted, receipt of the memory access request triggers a page fault, and the MMU searches the first portion of the process context saved to the at least one of the one or more VMA container pages based on the memory access request, wherein the memory access request is a request to access at least one of the one or more physical memory pages saved to the at least one of the one or more VMA container pages.

5. The system of claim 4, wherein the MMU conducts a read from the one or more restored physical memory pages containing the first portion of the process context based on the memory access request.

6. The system of claim 5, wherein the one or more restored physical memory pages are accessed based on the memory access request, and wherein the VMA page table to map of the one or more restored physical memory pages to the one or more VMA container pages in the VMA container eliminates restoration of one or more of the physical memory pages for which no after restart memory access requests are made.

7. The system of claim 6, wherein the memory includes two or more memory devices, wherein the MMU assesses one or more performance factors of the two or more memory devices, wherein the one or more performance factors are to include one or more of an access time or retrieval time, wherein the MMU selects one or more of the two or more memory devices to locate the VMA container, wherein the two or more memory devices include a swap space configured to operate in a swap-in mode, and wherein, when the checkpoint occurs, the MMU saves the VMA container to the swap space based on the one or more performance factors.

8. The system of claim 1, wherein the MMU is to allocate space in the memory for one or more restored physical memory pages based on an identification that the first portion corresponds to one or more of a frequently used physical memory page or a predicted to be frequently used physical memory page.

9. A method comprising:
   executing, by a processor, a process, wherein the process is assigned one or more physical memory pages in a memory, wherein a process context associated with the process includes a first portion and a second portion, wherein the first portion is different from the second portion;
   generating, by a memory management unit (MMU), a virtual memory address area (VMA) container comprising one or more VMA container pages, wherein the one or more VMA container pages are each identified by a location within the VMA container;
   generating, by the MMU, a VMA page table to map the one or more physical memory pages to the one or more VMA container pages;
   saving, by the MMU, the first portion of the process context to the at least one of the one or more VMA container pages;
   allocating, by the MMU, space in the memory for one or more restored physical memory pages based on a search of the first portion of the process context saved to the at least one of the one or more VMA container pages;
   copying, by the MMU, the first portion of the process context in the at least one of the one or more VMA container pages to the one or more restored physical memory pages based on a memory access request; and
   updating, by the MMU, the VMA page table to map the one or more restored physical memory pages to the at least one of the one or more VMA container pages.

10. The method of claim 9, wherein the process context includes one or more of a process state, a heap, a stack, or other process information, and wherein the one or more VMA container pages are each identified by a VMA page index.

11. The method of claim 10, further comprising:
    stopping, by the processor, execution of the process in response to a checkpoint associated with a checkpoint thread occurring;
    generating, by the MMU, a mapping of the one or more VMA container pages to the one or more physical memory pages; and
    saving, by the MMU, the second portion of the process context to a file storage device.

12. The method of claim 11, further comprising:
    restarting, by the processor, the process following the checkpoint occurring;
    receiving, by the processor, the memory access request, wherein the memory access request is a request to access at least one of the one or more physical memory pages saved to the at least one of the one or more VMA container pages triggering a page fault; and
    searching, by the MMU, the first portion of the process context saved to the at least one of the one or more VMA container pages based on the memory access request.

13. The method of claim 12, further comprising:
    conducting, by the MMU, a read from the one or more restored physical memory pages containing the first portion of the process context based on the memory access request.

14. The method of claim 13, further comprising:
    accessing, by the MMU, the one or more restored physical memory pages based on the memory access request; and
    eliminating, by the MMU, restoration of one or more of the physical memory pages for which no after restart memory access requests are made.

15. The method of claim 14, wherein the memory includes two or more memory devices, the method further comprising:
    assessing, by the MMU, one or more performance factors of the two or more memory devices, wherein the one or more performance factors include one or more of an access time or a retrieval time;
    selecting, by the MMU, at least one of the two or more memory devices to locate the VMA container, wherein the two or more memory devices include a swap space configured to operate in a swap-in mode; and
    saving, by the MMU, the VMA container to the swap space based on the one or more performance factors, when the checkpoint occurs.

16. The method of claim 9, further comprising allocating, with the MMU, space in the memory for one or more restored physical memory pages based on an identification that the first portion corresponds to one or more of a frequently used physical memory page or a predicted to be frequently used physical memory page.

17. At least one non-transitory computer readable storage medium comprising a set of instructions, which when executed by a computing device, cause the computing device to:
    execute, by a processor, a process, wherein the process is assigned one or more physical memory pages in a memory, wherein a process context associated with the process includes a first portion and a second portion, wherein the first portion is different from the second portion;
    generate, by a memory management unit (MMU), a virtual memory address area (VMA) container comprising one or more VMA container pages, wherein the one or more VMA container pages are each identified by a location within the VMA container;
    generate, by the MMU, a VMA page table to map the one or more physical memory pages to the one or more VMA container pages;
    save, by the MMU, the first portion of the process context to the at least one of the one or more VMA container pages;
    allocate, by the MMU, space in the memory for one or more restored physical memory pages based on a search of the first portion of the process context saved to the at least one of the one or more VMA container pages;

copy, by the MMU, the first portion of the process context in the at least one of the one or more VMA container pages to the one or more restored physical memory pages based on a memory access request; and updating, by the MMU, the VMA page table to map the one or more restored physical memory pages to the at least one of the one or more VMA container pages.

18. The at least one non-transitory computer readable storage medium of claim 17, wherein the instructions, when executed, further cause the computing device to:

wherein the process context is to include one or more of a process state, a heap, a stack, or other process information, and wherein the one or more VMA container pages are each identified by a VMA page index.

19. The at least one non-transitory computer readable storage medium of claim 18, wherein the instructions, when executed, further cause the computing device to:

stop, by the processor, execution of the process in response to a checkpoint associated with a checkpoint thread occurring;

generate, by the MMU, a mapping of the at least one of the one or more VMA container pages to the one or more physical memory pages; and save, by the MMU, the second portion of the process context to a file storage device.

20. The at least one non-transitory computer readable storage medium of claim 19, wherein the instructions, when executed, further cause the computing device to:

restart, by the processor, the process following the checkpoint occurring;

receive, by the processor, the memory access request, wherein the memory access request is a request to access at least one of the one or more physical memory pages saved to the at least one of the one or more VMA container pages, the instructions further cause the computing device to trigger a page fault; and search, by the MMU, the first portion of the process context saved to the at least one of the one or more VMA container pages based on the memory access request.

21. The at least one non-transitory computer readable storage medium of claim 20, wherein the instructions, when executed, further cause the computing device to:

conduct, by the MMU, a read from the one or more restored physical memory pages containing the first portion of the process context based on the memory access request;

access, by the MMU, the one or more restored physical memory pages based on the memory access request; and eliminate, by the MMU, restoration of one or more of the physical memory pages for which no after restart memory access requests are made.

22. The at least one non-transitory computer readable storage medium of claim 21, wherein the memory includes two or more memory devices, wherein the instructions, when executed, further cause the computing device to:

assess, by the MMU, one or more performance factors of the two or more memory devices, wherein the one or more performance factors are to include one or more of an access time or a retrieval time;

select, by the MMU, at least one of the two or more memory devices to locate the VMA container, wherein the two or more memory devices are to include a swap space configured to operate in a swap-in mode; and save, by the MMU, the VMA container to the swap space based on the one or more performance factors, when the checkpoint occurs.

23. The at least one non-transitory computer readable storage medium of claim 17, wherein the instructions, when executed, further cause the computing device to allocate with the MMU, space in the memory for one or more restored physical memory pages based on an identification that the first portion corresponds to one or more of a frequently used physical memory page or a predicted to be frequently used physical memory page.

* * * * *